United States Patent [19]
LaBounty et al.

[11] Patent Number: 6,119,970
[45] Date of Patent: Sep. 19, 2000

[54] HEAVY-DUTY DEMOLITION APPARATUS WITH REPLACEABLE CRUSHING AND SHEARING TIP

[75] Inventors: Kenneth R. LaBounty, Two Harbors; Ross D. Christenson, Esko; Daniel P. Jacobson, Wrenshall, all of Minn.

[73] Assignee: Genesis Equipment & Manufacturing, Inc., Superior, Wis.

[21] Appl. No.: 09/267,569

[22] Filed: Mar. 12, 1999

Related U.S. Application Data

[63] Continuation-in-part of application No. 09/200,668, Nov. 25, 1998.

[51] Int. Cl.[7] ............................................. B23D 17/06
[52] U.S. Cl. ........................ 241/101.73; 30/134; 30/228; 241/266
[58] Field of Search ................ 30/134, 228; 241/101.73, 241/266

[56] References Cited

U.S. PATENT DOCUMENTS

| | | | |
|---|---|---|---|
| Re. 35,432 | 1/1997 | LaBounty et al. | 30/134 |
| 4,198,747 | 4/1980 | LaBounty | 30/134 |
| 4,403,431 | 9/1983 | Ramun et al. | 30/134 X |
| 4,450,625 | 5/1984 | Ramun et al. | 30/134 |
| 4,512,524 | 4/1985 | Shigemizu | 241/101.7 |
| 4,519,135 | 5/1985 | LaBounty | 30/134 |
| 4,543,719 | 10/1985 | Pardoe | 30/134 |
| 4,558,515 | 12/1985 | LaBounty | 30/134 |
| 4,669,187 | 6/1987 | Pardoe | 30/134 |
| 4,670,983 | 6/1987 | Ramun et al. | 30/134 |
| 4,686,767 | 8/1987 | Ramun et al. | 30/134 |
| 4,697,509 | 10/1987 | LaBounty | 100/223 |
| 4,771,540 | 9/1988 | LaBounty | 30/134 |
| 4,776,093 | 10/1988 | Gross | 30/134 |
| 4,838,493 | 6/1989 | LaBounty | 241/101.7 |
| 4,881,459 | 11/1989 | Ramun | 100/95 |
| 4,897,921 | 2/1990 | Ramun | 30/134 |
| 4,951,886 | 8/1990 | Berto | 241/101.7 |
| 5,044,569 | 9/1991 | LaBounty et al. | 241/266 |
| 5,060,378 | 10/1991 | LaBounty et al. | 30/134 |
| 5,062,227 | 11/1991 | De Gier et al. | 37/117.5 |
| 5,146,683 | 9/1992 | Morikawa et al. | 30/134 |
| 5,183,216 | 2/1993 | Wack | 241/101.7 |
| 5,187,868 | 2/1993 | Hall | 30/134 |
| 5,230,151 | 7/1993 | Kunzman et al. | 30/134 |
| 5,339,525 | 8/1994 | Morikawa | 30/134 |
| 5,384,962 | 1/1995 | Pemberton | 30/134 |
| 5,385,311 | 1/1995 | Morikawa et al. | 241/266 |
| 5,474,242 | 12/1995 | Rafn | 241/101.73 |
| 5,478,019 | 12/1995 | Morikawa et al. | 241/101.73 |
| 5,533,682 | 7/1996 | De Gier et al. | 241/101.73 |
| 5,619,881 | 4/1997 | Morikawa et al. | 72/330 |
| 5,669,141 | 9/1997 | Morikawa et al. | 30/134 |
| 5,671,892 | 9/1997 | Morikawa et al. | 241/101.73 |
| 5,715,603 | 2/1998 | Dorquin | 30/134 |
| 5,873,168 | 2/1999 | Johnson et al. | 30/134 |

OTHER PUBLICATIONS

Brochure, LaBounty Universal Processor Shear Jaws Attachment.
Photographs and literature—Teledyne Shear.
Literature Veratech Shear Attachments.
Literature, Iron Ax Shears.
Photographs, Komatsu (Oyodo) Shear.
Product Drawing ORT Oberlander Shear.

*Primary Examiner*—Joseph J. Hail, III
*Assistant Examiner*—William Hong
*Attorney, Agent, or Firm*—Gerald E. Helget; Rider, Bennett, Egan & Arundel

[57] ABSTRACT

A heavy-duty shearing and crushing demolition apparatus for attachment to a boom structure and hydraulic system of an excavator. The apparatus includes a lower jaw with a primary blade, an upper jaw with primary and secondary blades oblique with respect to each other, and a shearing and crushing tip on the upper jaw secondary blade with a shearing point, a crushing point, and a support and shearing tip blade portion between the shearing point and the crushing points. This structure exposes the crushing point for crushing when the upper jaw is open from the lower jaw with the shearing tip out of the way and also exposes the shearing tip for shearing when the upper jaw is closing into the lower jaw. This permits shearing beginning at the shearing tip and shearing rearwardly. The support and shearing tip blade portion supports the workpiece while shearing it, producing a substantially flat non-contoured or twisted workpiece.

19 Claims, 15 Drawing Sheets

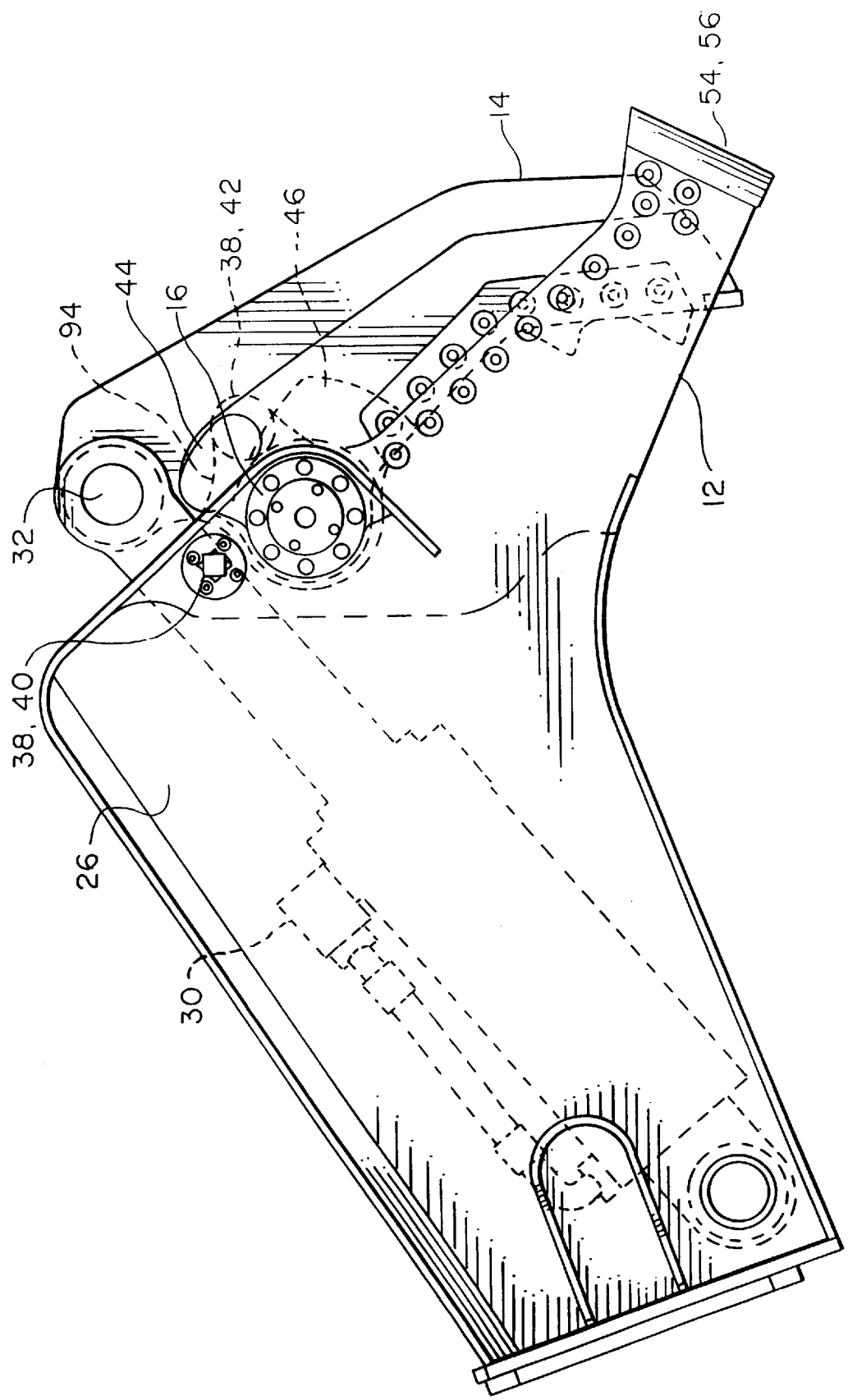

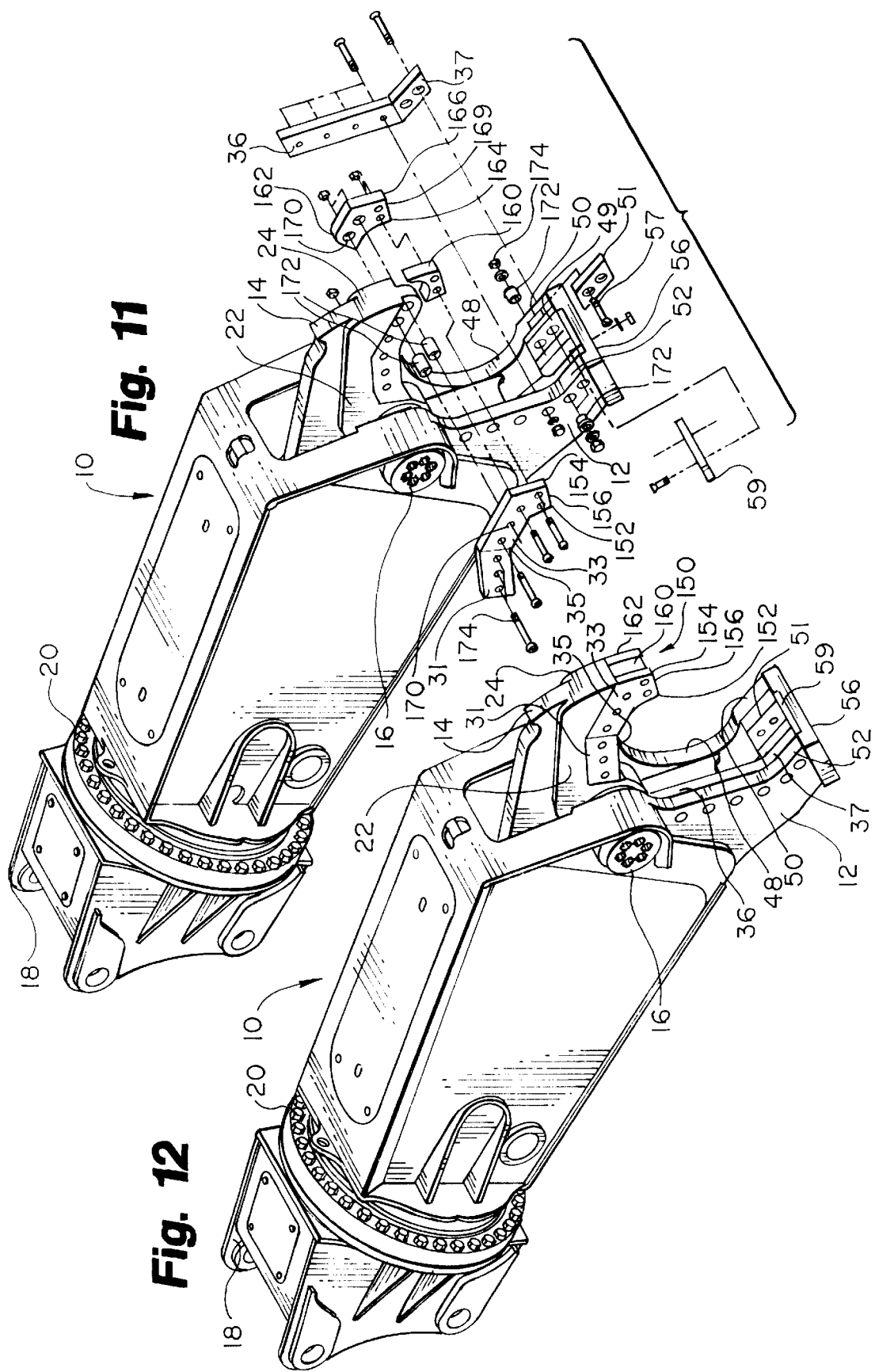

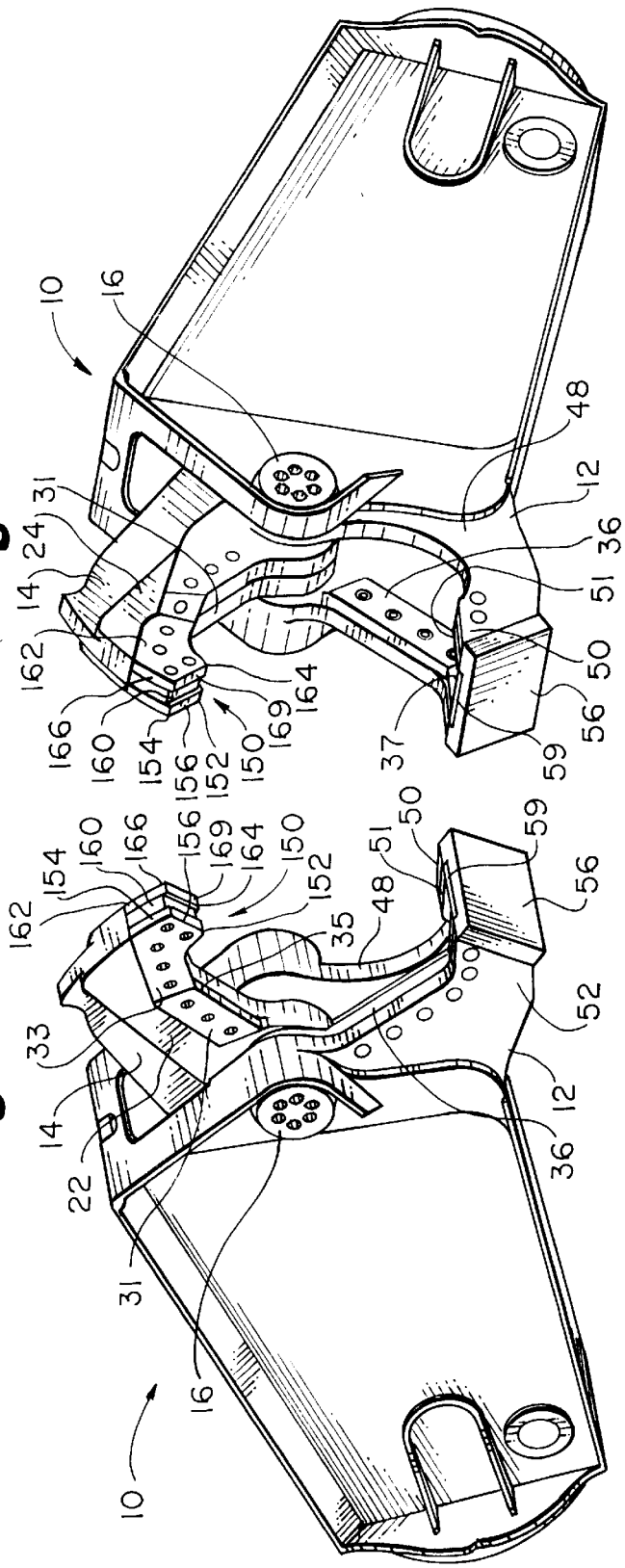

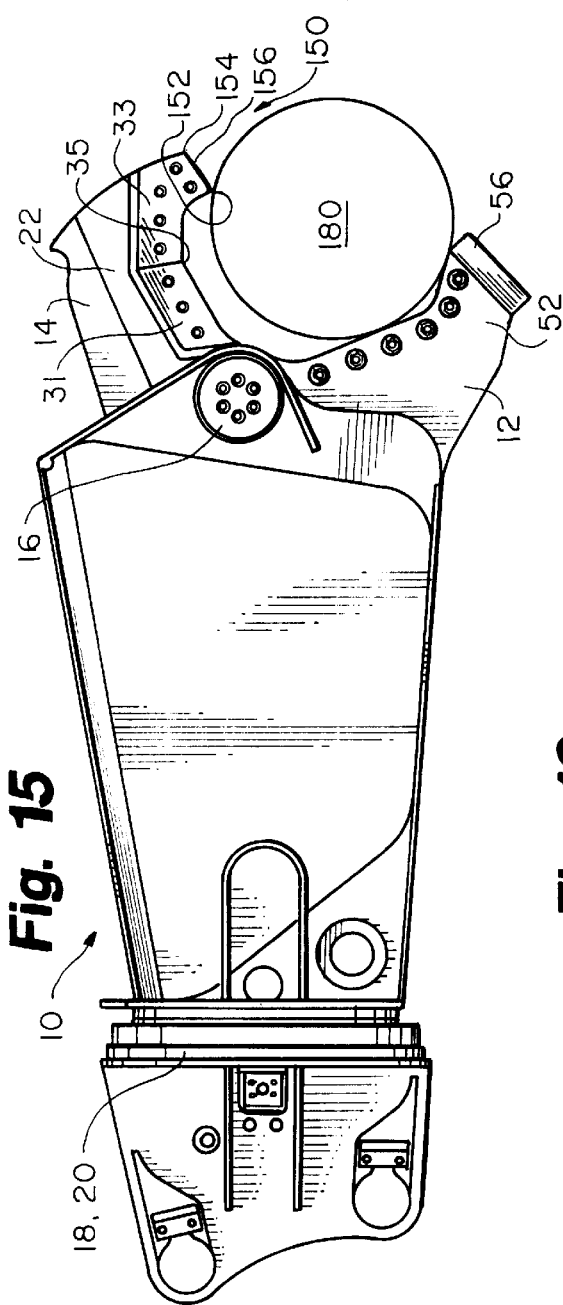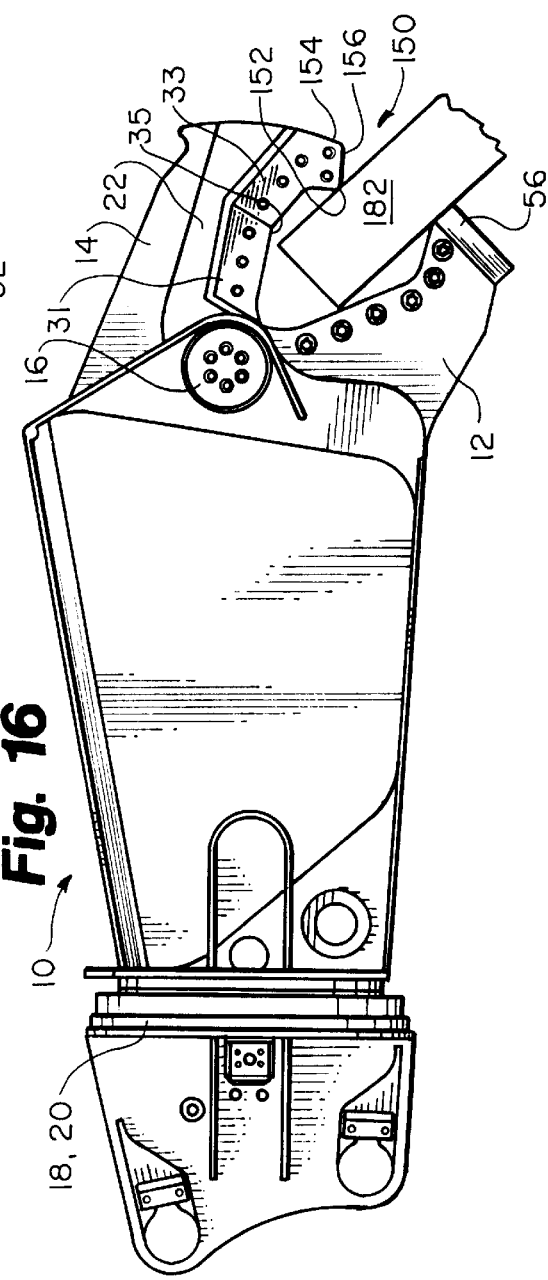

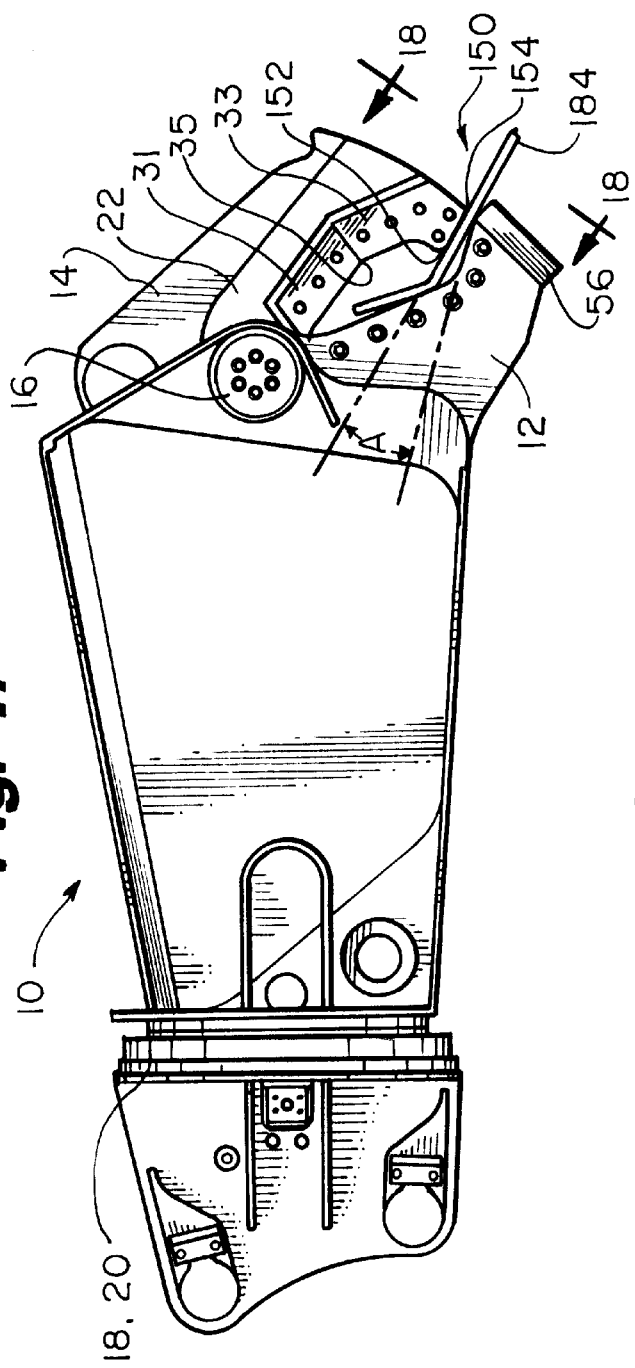

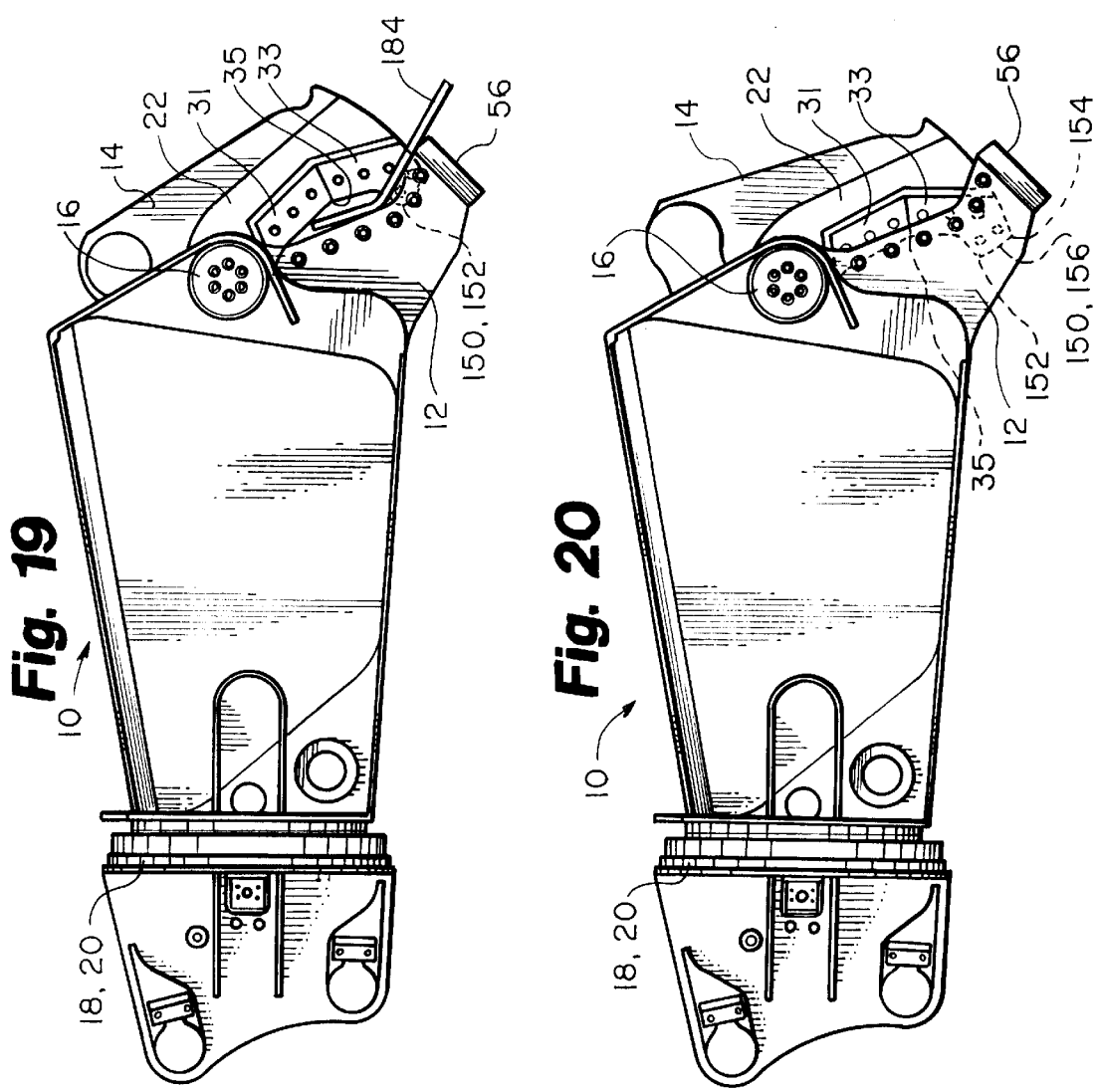

HEAVY-DUTY DEMOLITION APPARATUS WITH REPLACEABLE CRUSHING AND SHEARING TIP

This application is a continuation-in-part of U.S. application Ser. No. 09/200,668, now allowed filed on Nov. 25, 1998, entitled heavy duty demolition apparatus with blade stabilizing device.

BACKGROUND OF THE INVENTION

A fuller understanding of the operation of the demolition apparatus of the present invention may be achieved by studying U.S. Pat. No. 4,519,135, hereby incorporated by reference. This invention relates to a heavy duty demolition apparatus, especially adapted to be mounted on a rigid boom of a mobile vehicle and particularly adapted to be mounted on the dipper stick of an excavator, with a blade stabilizing device to keep the upper jaw of the apparatus from moving laterally relative to the lower jaw and breaking during the shearing operation on a workpiece.

The invention also has a replaceable crushing and shearing tip on the movable upper jaw.

Heavy duty shears of the type that are powered by hydraulic cylinders are proving more and more useful in handling scrap and especially metal scrap of all sorts. Such scrap comes in many different forms, and may be in the form of pipes made of steel or soft iron or cast iron, ranging in sizes from 2 inches or smaller, and up to 8 or 10 inches in diameter or larger; structural beams such as I-beams, channels, angle beams in a large range of sizes, up to 8 or 10 inches across and larger; rods and heavy cables having diameters of 2 to 3 inches and larger, metal sheets and plates and formed metal of all sorts including wheels and automobile and truck frames, and a myriad of long and short pieces of stock and metal pieces that are cast, rolled, stamped or otherwise formed, both singly and in various types of assembly.

The prior art has included numerous shears such as that illustrated in U.S. Pat. No. 4,198,747; U.S. Pat. No. 4,188,721; U.S. Pat. No. 4,897,921; U.S. Pat. No. 4,543,719; U.S. Pat. No. 4,558,515 and U.S. Pat. No. 4,104,792. Typically, these heavy duty shears mount on the dipper stick of an excavator so that the shears may be controlled fairly well in handling various types of scrap and cutting the scrap into smaller twisted and contorted pieces and lengths as the scrap is drawn into the throat of the shear.

Typically, these shears have a fixed lower jaw and a movable upper jaw that pivots on the lower jaw, with shear blades of hardened steel on both the upper jaw and the lower jaw. The workpiece is sheared by closing the upper jaw against the lower jaw under hydraulic pressure, with the shear blades cutting the workpiece. The movable upper jaw may also have a fixed, hardened shearing tip integral with the upper jaw. The tip is not suitable for removal and replacement due to the high lateral forces exerted on the tip as the movable jaw flexes laterally. Great tension is also exerted upon the tip, which may be wedged tight with scrap, upon opening the jaws. Direct shear bearing loads are also on the tip when shearing. All these factors will cause a removable tip to readily break off the upper jaw.

As stated, great lateral as well as vertical pressures develop against the movable upper jaw as it contacts and proceeds to cut the workpiece. This lateral pressure can cause the upper jaw to crack or otherwise experience structural failure. The lateral pressure exists from the moment the upper jaw contacts the workpiece until the workpiece is cut and the upper jaw meets the lower jaw and becomes supported by the lower jaw in a slot in the lower jaw. This lateral force develops analogously to when a person tries to cut too heavy an object with a pair of scissors. The scissors' blades are forced laterally apart and may break.

There is a need for a heavy duty demolition shear with a blade stabilizing device that prevents lateral movement of the upper jaw relative to the lower jaw and which supports the upper jaw against this lateral pressure. Such a shear should produce relatively clean or flat pieces of scrap which will allow the reduced scrap to stack and allow for more reduced scrap wad density.

In rebuilding highways for motor vehicle travel, and in the demolition of structures which are largely made of or incorporate reinforced concrete as structural members, the disposal of large pieces of concrete paving or reinforced concrete structure becomes a significant problem. Many governmental regulations and practical considerations relating to the operation of landfills prohibit the disposal of concrete slabs and large reinforced concrete structures by simply burying them in the landfills. Accordingly, it becomes necessary to dispose of such concrete material in other ways.

Crushing of the concrete is one alternative so that the concrete slabs and structures may be reduced to smaller particle sizes which accommodates the reuse of such concrete as fill and as aggregate base for roadways and the like.

It has been possible in the past to reduce concrete into particles and chunks by use of heavy duty shears, but such shears which are primarily designed for shearing steel and other metallic and wood structures have sharpened blades and are rather expensive for the purpose of reducing concrete slabs and structures which is thought to be accomplished in other ways. Such crushers are shown in U.S. Pat. Nos. 5,478,019; 4,512,524; 5,183,216; 5,044,569; and 4,951,886. Many of these crushers have crushing teeth rather than shearing blades.

Furthermore, crushing concrete may result in the development of lateral pressure against the movable upper jaw of a demolition shear in the same way that shearing metal does.

There is a need for a demolition shear apparatus with a replaceable crushing and shearing tip for both crushing concrete and shearing scrap metal.

SUMMARY OF THE INVENTION

A blade stabilizer device for a heavy-duty material handling demolition tool for shearing and crushing scrap material which includes a lower jaw with an elongate primary shearing blade. The lower jaw is connected to the boom structure of a hydraulic system of an excavator. The total has an upper jaw pivotally connected and closeable upon the lower jaw beginning at the distal end from the pivot point. The blade stabilizing device consists of a wear guide supported by the lower jaw adjacent the pivot point slidably engaging the upper movable jaw to keep the upper jaw in close engagement with the lower jaw. The wear guide is mounted behind the pivot point. A second wear guide may be mounted in front of the pivot point on the opposite side of the upper jaw to cross-brace the upper jaw. The upper jaw has a replaceable crushing and shearing tip. The tip is held in place by bolts and retaining bushings.

An object and advantage of the invention is to provide an improved heavy-duty material handling demolition tool for shearing and crushing scrap material with a blade stabilizing device which prevents the upper jaw from moving relative to the lower jaw, thus improving the cutting ability of the tool for heavy scrap material.

Another object and advantage of the present invention is to provide a blade stabilizing device for a heavy-duty demolition tool which reduces lateral stress on the upper jaw caused due to shearing the workpiece.

Another object and advantage of the present invention is that the blade stabilizing device is removable and replaceable when worn due to friction with the upper jaw.

Another object and advantage of the present invention is that the clearance between the blade stabilizing device and the upper jaw is adjustable to compensate for wear.

Another object and advantage of the present invention is that the blade stabilizing device contacts a wear surface on the upper jaw and the wear surface is dimensioned such that the blade stabilizing device does not contact the wear surface once the upper jaw is securely received in the lower jaw.

Another object and advantage of the present invention is that the blade stabilizing device may comprise a first stabilizer mounted to the rear of the pivot point and a second stabilizer mounted in front of the pivot point, thereby providing cross-bracing to the upper jaw.

Another object and advantage is that the upper jaw has a replaceable crushing and shearing tip.

Another object and advantage is that the replaceable tip is held in place by nuts and bolts passing through retaining bushings which will hold the tip in place despite high direct and lateral/forces, as well as stress shearing forces and tensional forces exerted on the tip when opening the shear with jammed scrap pieces about the tip.

Another object and advantage is that the shear produces relatively clean and flat reduced scrap for easy stacking of the reduced scrap and increased load densities for transportation of the reduced scrap due to the upper jaw blades and tip shape in relation to the elongate lower jaw primary shearing blade.

BRIEF DESCRIPTION OF THE DRAWINGS

FIG. 10 is the same as FIG. 8, showing the upper jaw fully closed.

FIG. 11 is an exploded perspective view of the demolition shear or apparatus 10 showing the replaceable crushing and shearing tip and bushing of this invention.

FIG. 12 is a similar view to FIG. 11 with the shearing blades and wear plates fixed in place.

FIG. 13 is another perspective view of the shear illustratively showing the replaceable crushing and shearing tip from the shearing or right side.

FIG. 14 is another perspective view of the shear from the guide or left side further showing the replaceable crushing and shearing tip.

FIG. 15 is a right-side elevational view of the shear with the crushing tip bearing down upon a column of cement or crushing.

FIG. 16 is a right-side or shearing side elevational view showing the crushing tip bearing down upon a slab of concrete.

FIG. 17 is a right-side elevational view of the shear with the replaceable tip beginning to shear a metal plate.

FIG. 18 is a front elevational view taken along lines 18—18 of FIG. 17 showing the shearing points first beginning to shear before the recessed center tip begins to shear.

FIG. 19 is a right-side elevational view of the shear piercing and shearing the metal plate advanced from FIGS. 17 and 18.

FIG. 20 is a right-side elevational view showing the upper shear blade in its most closed position.

DETAILED DESCRIPTION OF THE PREFERRED EMBODIMENTS

Figure 1:
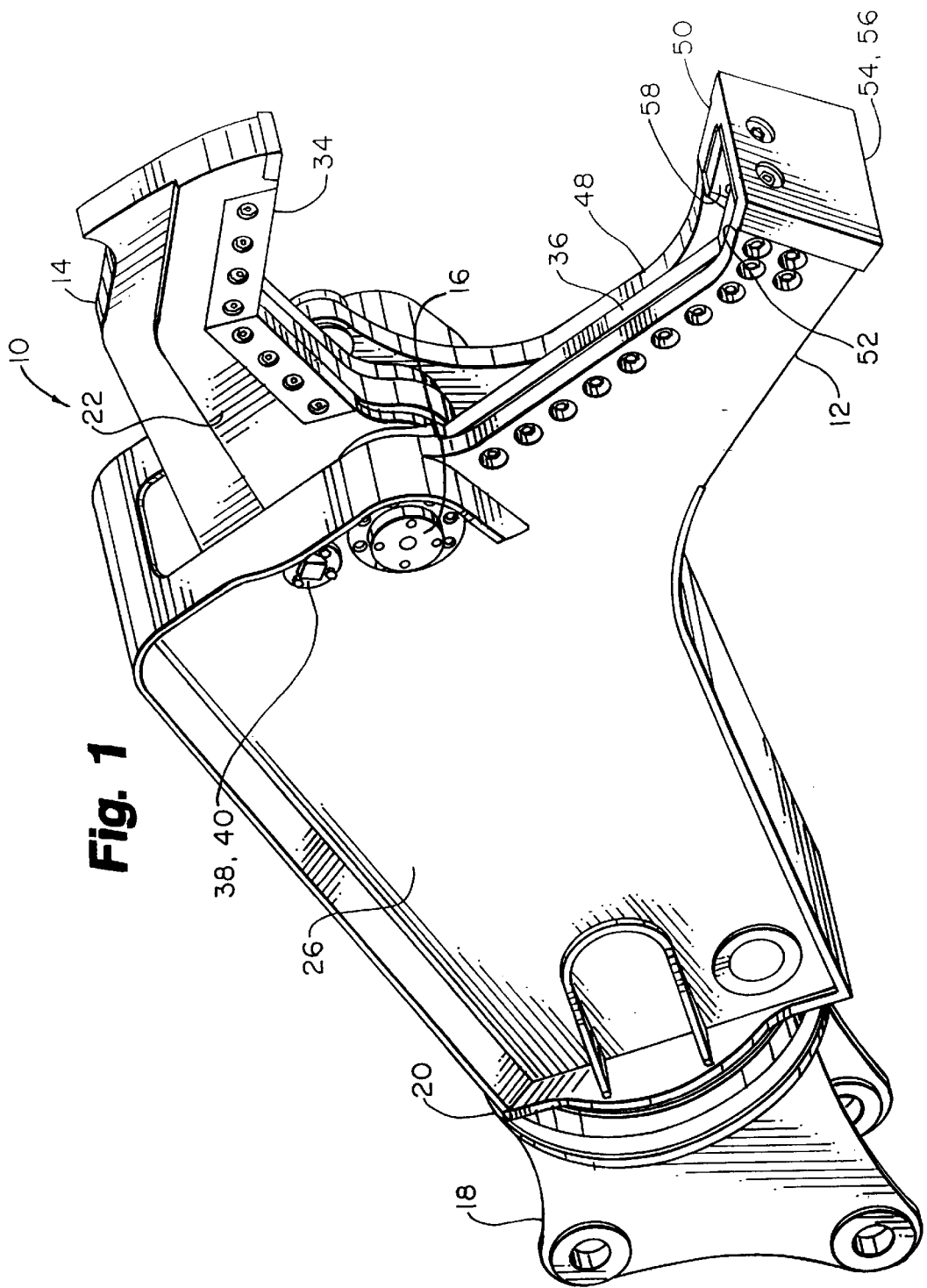
FIG. 1 is a right-side perspective view of the heavy-duty demolition apparatus of the present invention.

The heavy-duty demolition apparatus of the present invention is generally referred to in the Figures as reference numeral 10.

Referring to FIGS. 1 through 6, the heavy-duty demolition apparatus 10 comprises a lower jaw 12, an upper jaw 14, pivot means 16 interconnecting the lower jaw 12 and upper jaw 14, and means 18 for attachment to the excavator (not shown). The means 18 may further include a rotator unit 20 allowing rotation of the demolition unit 10 about a longitudinal axis. The apparatus 10 also includes means 30 for attachment to the hydraulic system of an excavator (not shown) for closing and opening the upper jaw relative to the lower jaw. More specifically, the means 30 includes a cylinder 30a having a reciprocating piston 30b within the cylinder 30a. The cylinder 30a is connected to the hydraulic system of the excavator (not shown). The piston 30b connects to the upper jaw 14 at a knuckle 32.

The upper jaw 14 has a first side 22, and a second side 24. The lower jaw 12 has a first mounting plate 26 adjacent the first side 22, and a second mounting plate 28 adjacent the second side 24. The first mounting plate 26 and second mounting plate 28 receive the pivot means 16 between them.

Figure 2:
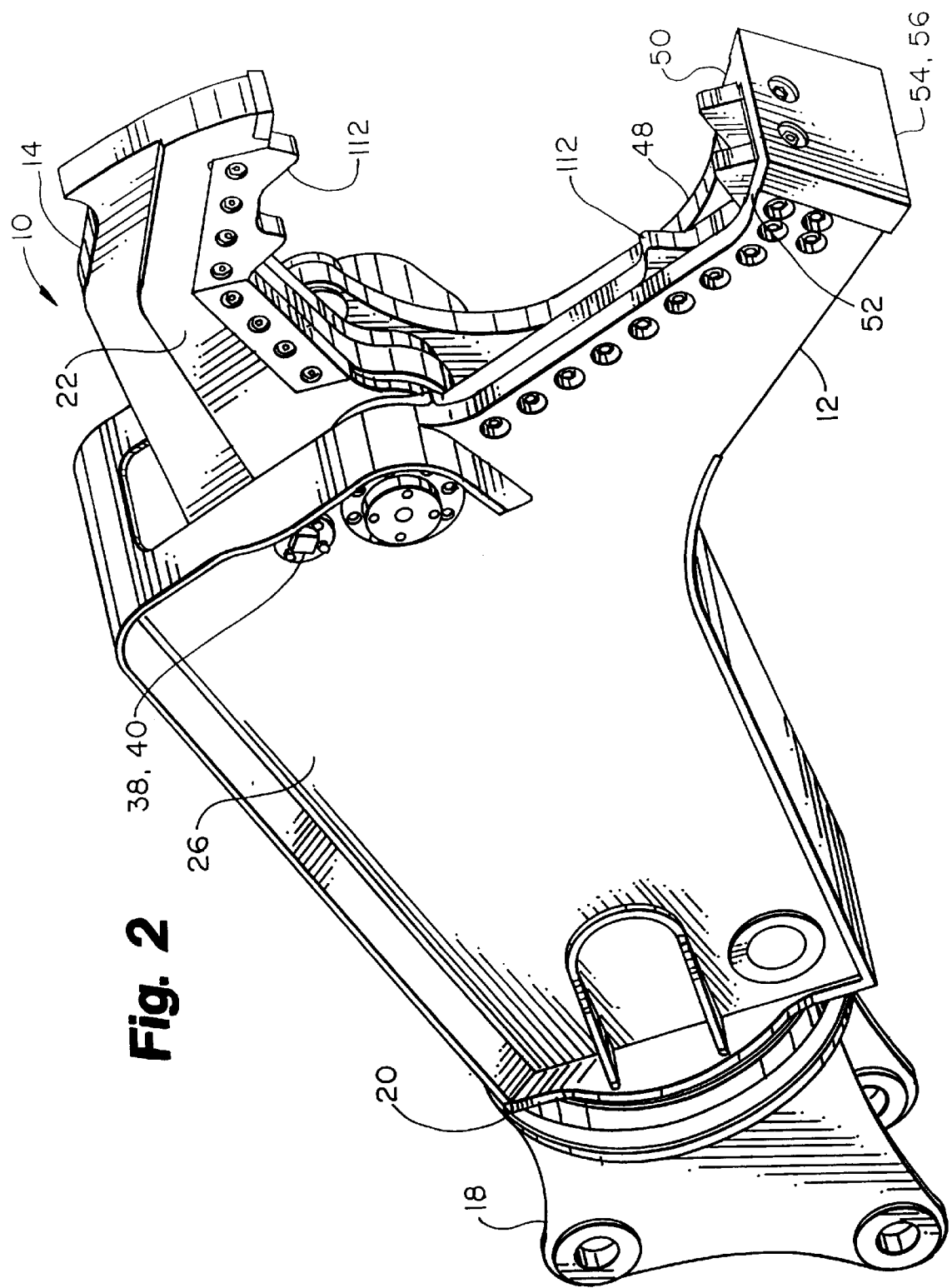
FIG. 2 is the same as FIG. 1, with one or more of the shear blades being replaced by breaker teeth for crushing concrete.

The upper jaw 14 has upper shear blades 33 and 34 meeting at apex 35 and the lower jaw 12 has lower shear blades 36 and 37 extending along each other for shearing a workpiece when the upper shear blades 33 and 34 are closed upon the lower shear blades 36 and 37. Preferably, the shear blades 33, 34, 36 and 37 are replaceable. FIG. 1 shows a configuration in which the apparatus 10 has only shear blades mounted thereon. FIG. 2 and the other figures show a configuration in which one or more of the upper shear blades 34 and lower shear blades 36 are replaced with breaker teeth 112 for crushing materials. It will be appreciated that lower shear blade 36 is at least twice as long as secondary shear blade 37 which assists in creating flat reduced scrap pieces. Primary blade 36 may be two to four times longer than secondary blade 37. Two and one-half times in length works quite well.

A blade stabilizing device 38 for the apparatus 10 engages the upper jaw 14 to prevent the upper jaw 14 from moving laterally with respect to the lower jaw 12 while shearing the workpiece.

Preferably, the blade stabilizing device 38 further comprises a first blade stabilizer 40 attached to the first mounting plate 26 and slidably engaging the upper jaw 14 on the first side 22 of the upper jaw 14; and a second blade stabilizer 42 attached to the second mounting plate 28 and slidably engaging the upper jaw 14 on the second side 24 of the upper jaw 14.

Preferably, the apparatus 10 further comprises a first arcuate wear surface 44 on the first side 22 and contacting the first blade stabilizer 40 and a second arcuate wear surface 46 on the second side 24 and contacting the second blade stabilizer 42. The second arcuate wear surface 46 may be on a hub 64 or reinforced section of the upper jaw 14. The wear surfaces 44, 46 may preferentially be constructed of a different material from the upper jaw 14 in order to better resist sliding friction cause by the first blade stabilizer 40 and second blade stabilizer 42.

Preferably, the apparatus 10 further comprises a guide blade 48 on the lower jaw 12 lying along the lower shear blade 36 and in spaced relation therewith, the outer end 50 of the guide blade and outer end 52 of the shear blade being adjacent each other, and rigid means 54 securing the outer ends 50, 52 together. The rigid means 54 is preferably a tie plate 56.

An open slot 58 preferably exists between the lower shear blade 36 and the adjacent guide blade 48 to receive the upper shear blade 34 therein, the open slot 58 having a width wider than the thickness of the upper shear blade 34 to maintain open space between the upper shear blade 34 and the guide blade 48 when the upper shear blade 34 is in the open slot 58. Preferably, the first arcuate wear surface 44 and second arcuate wear surface 46 are of such dimensions that the first blade stabilizer 40 and also perhaps the second blade stabilizer 42 move off the first arcuate wear surface 44 and second arcuate wear surface 46, respectively, when the upper shear blade 34 is received in the open slot 58. This is because the first blade stabilizer 40 and second blade stabilizer 42 are no longer needed to brace the upper jaw 14 once the upper shear blade 34 is received in the slot 58. To further brace the upper jaw 14, the lower jaw 12 has guide plates 60 adjacent the slot 58 which bear upon wear plate 62 on the upper jaw 14.

Preferably, the first blade stabilizer 40 and second blade stabilizer 42 are removable and replaceable when they become worn due to frictional contact with the upper jaw 14. The first blade stabilizer 40 and second blade stabilizer 42 may also be adjustable to provide variable clearance between them and the upper jaw 14, as for example as the blade stabilizers become worn.

Figure 3:
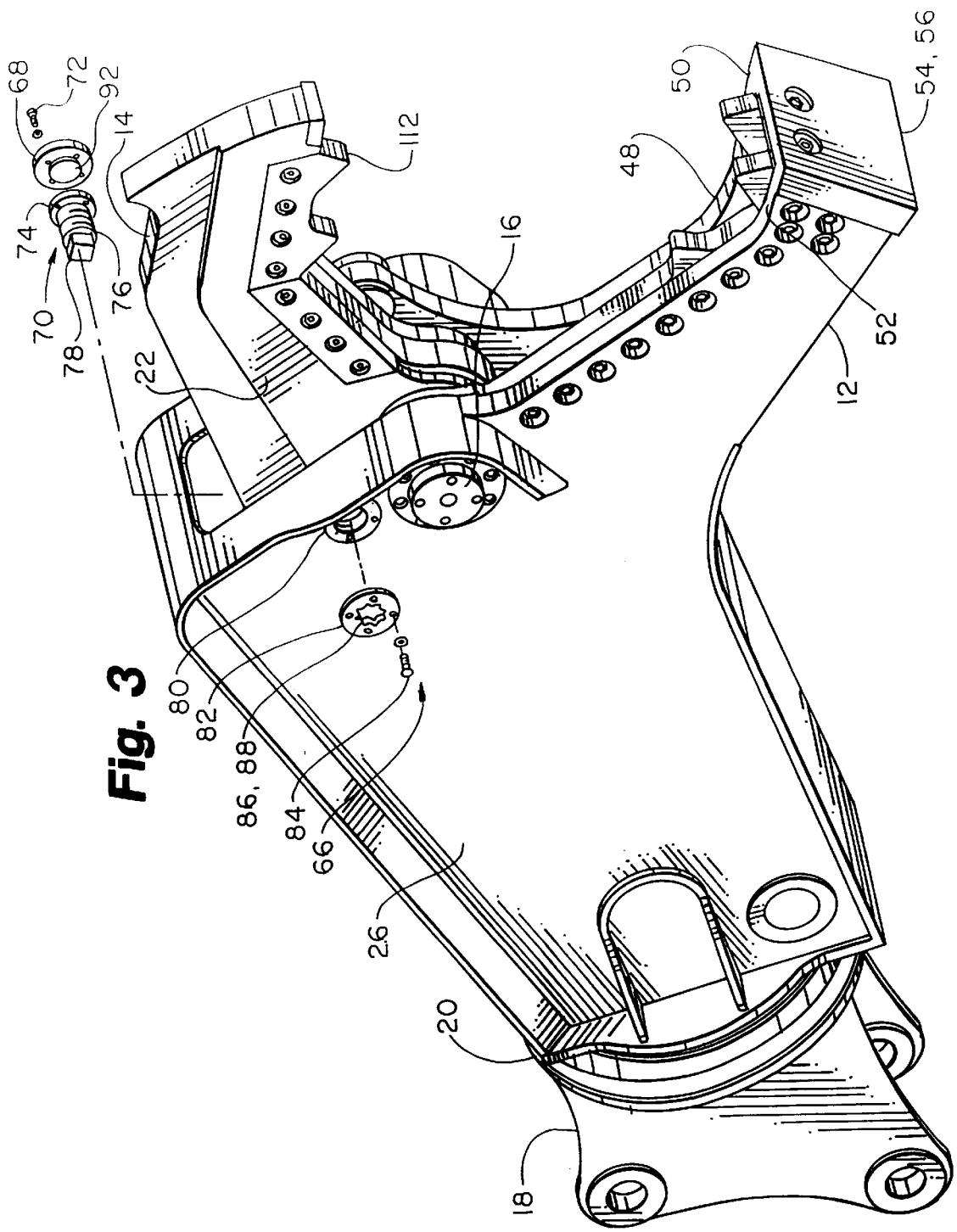
FIG. 3 is a right-side perspective view of the heavy-duty demolition apparatus of the present invention, with the parts of the first or rear blade stabilizer being shown in exploded view.
Figure 4:
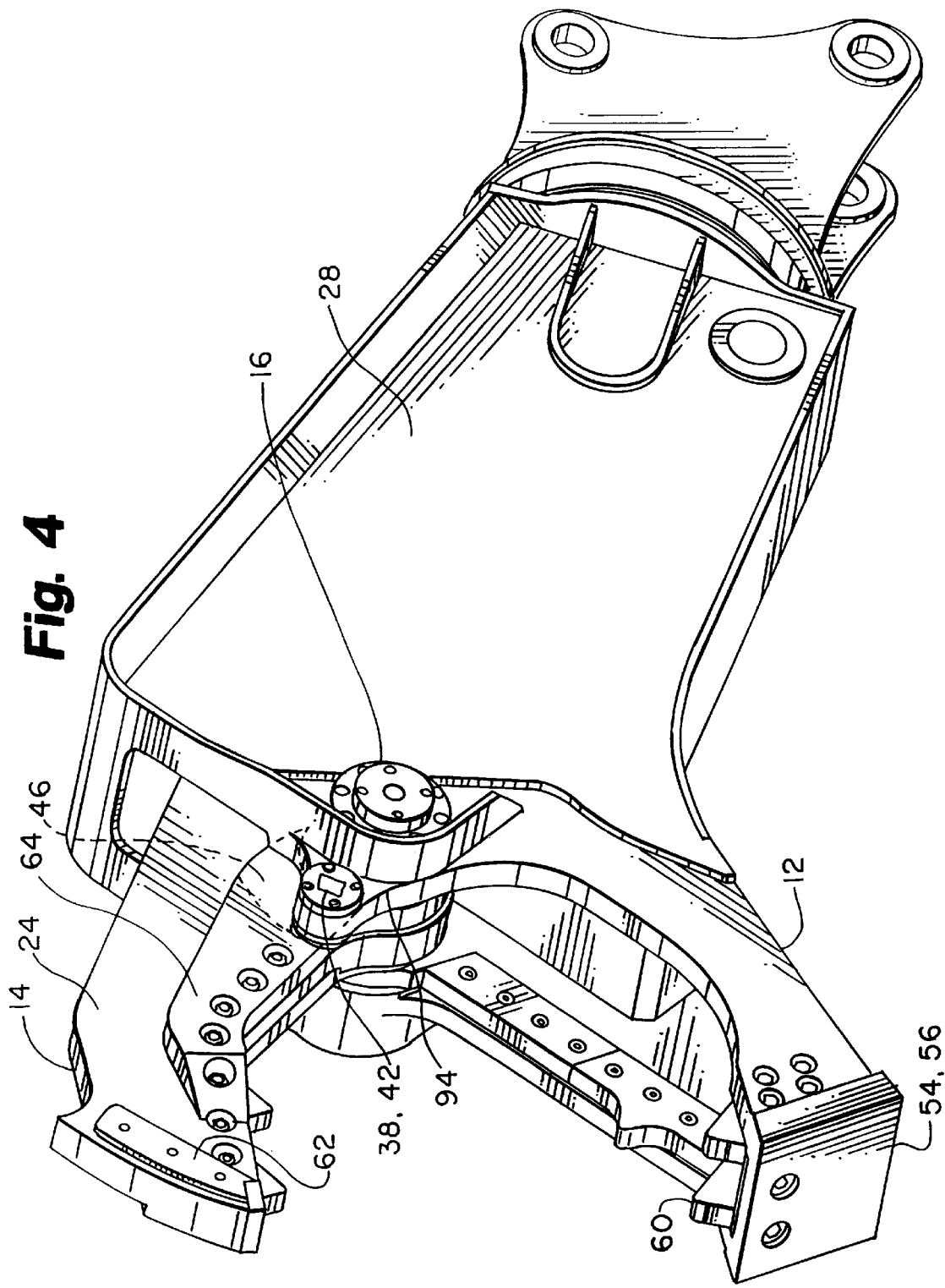
FIG. 4 is a left-side perspective view of the heavy-duty demolition apparatus.
Figure 7:
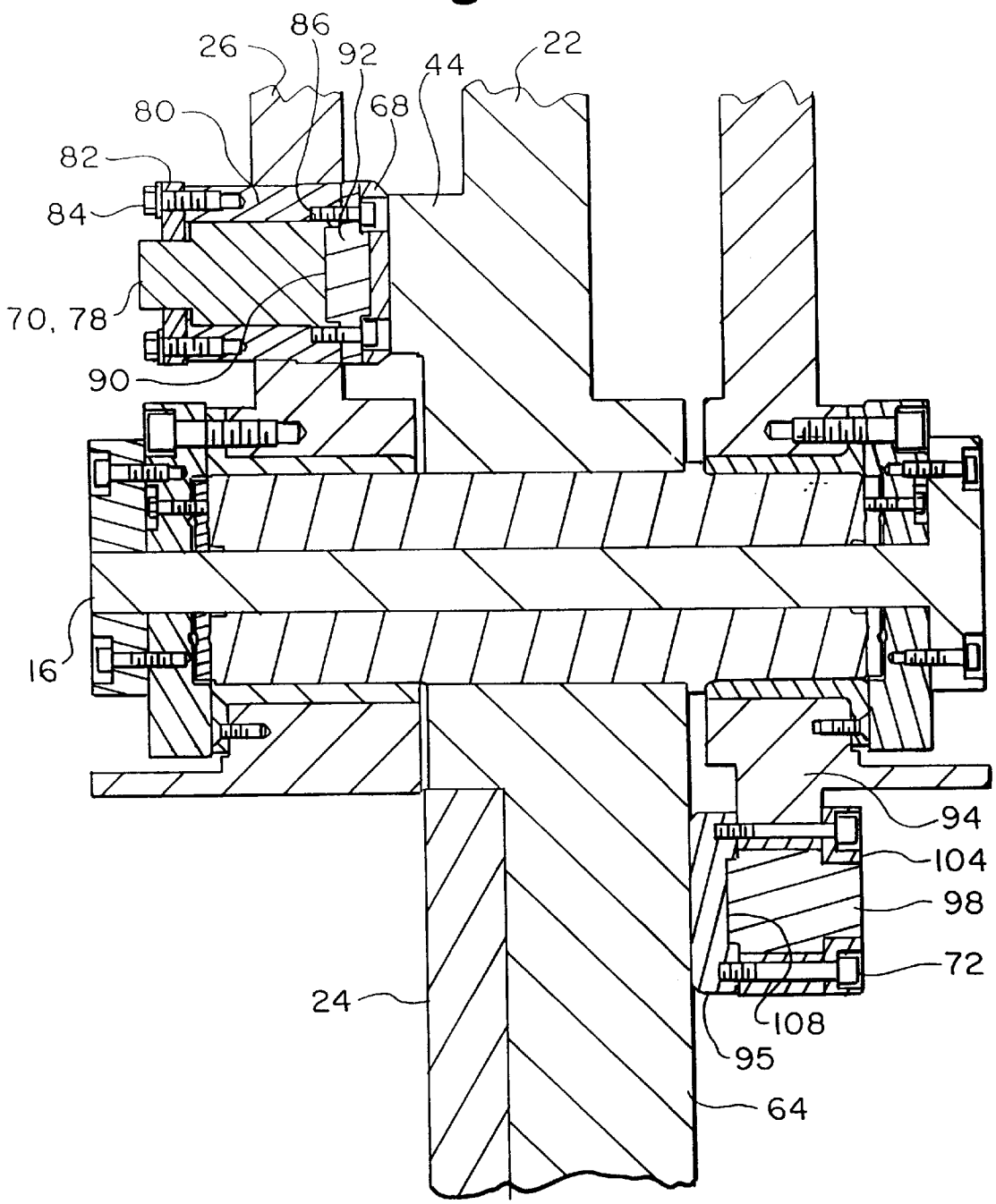
FIG. 7 is a progressive cross-section along the lines 7—7 of FIG. 6.

In the preferred embodiment, the first blade stabilizer 40 further comprises a wear guide or pad assembly 66 located rearwardly of the pivot means 16. FIGS. 3 and 7 show the details of the pad assembly 66.

The wear guide or pad assembly 66 comprises a guide 68; an adjustable first slide screw 70 receiving the guide 68; guide connectors 72 for mounting the guide 68 to the first slide screw 70; the adjustable first slide screw 70 further comprising a guide mounting disc 74 for mounting the guide or pad 68, an externally threaded body 76, and a bolt end 78 opposite the guide; an internally threaded first slide screw retainer 80 mounted in the first mounting plate 26, the first slide screw body 76 threadingly engaging the first slide screw retainer 80 and being prevented from over-extension by seats 81 and the guide 68 being adjustably spaced from the first side 22 by means of turning the bolt end 78; and a first lock plate 82 mounting to the first slide screw retainer 80 by lock plate retainers 84, the first lock plate 82 having a slide screw aperture 86 receiving the bolt end 78 of the first slide screw 70 and adapted to prevent the first slide screw 70 from turning. Preferably, the slide screw aperture 86 has cut-outs 88 which prevent the bolt end 78 from turning.

In order to prevent the guide connectors 72 from shearing off due to pressure from the upper jaw 14, the guide mounting disc 74 preferably has a central depression 90, and the guide 68 has a raised boss 92 indexing the central depression 90, as best seen in FIG. 7.

The second blade stabilizer 42 (FIGS. 5 and 7) may preferably comprise a wear guide or pad assembly 66 located forwardly of the pivot means 16. The first blade stabilizer 40 and second blade stabilizer 42 thus provide cross-bracing to the upper jaw 14 across the pivot means 16.

The second blade stabilizer 42 further comprises a guide or pad support 94 of integral construction with the second mounting plate 28; an internally threaded slide screw aperture 96 in the guide support 94; an adjustable externally threaded second slide screw 98 threadingly engaging the slide screw aperture 96, the guide 95 being mounted on the second slide screw 98; the adjustable second slide screw 98 further comprising an externally threaded body 100 and a bolt end 102 opposite the guide 95; and a second lock plate 104 mounting to the guide support 94, the second lock plate 104 having a slide screw aperture 106 receiving the bolt end 102 and adapted to prevent the second slide screw 98 from turning. Preferably, the slide screw aperture 106 has cut-outs 88 restraining the bolt end 102 from turning.

In order to prevent the guide connectors 72 from shearing off due to pressure from the upper jaw 14, the guide 95 preferably has a central depression 110, and the second slide screw 98 has a raised boss 108 indexing the central depression 110, as best seen in FIG. 7.

Figure 8:
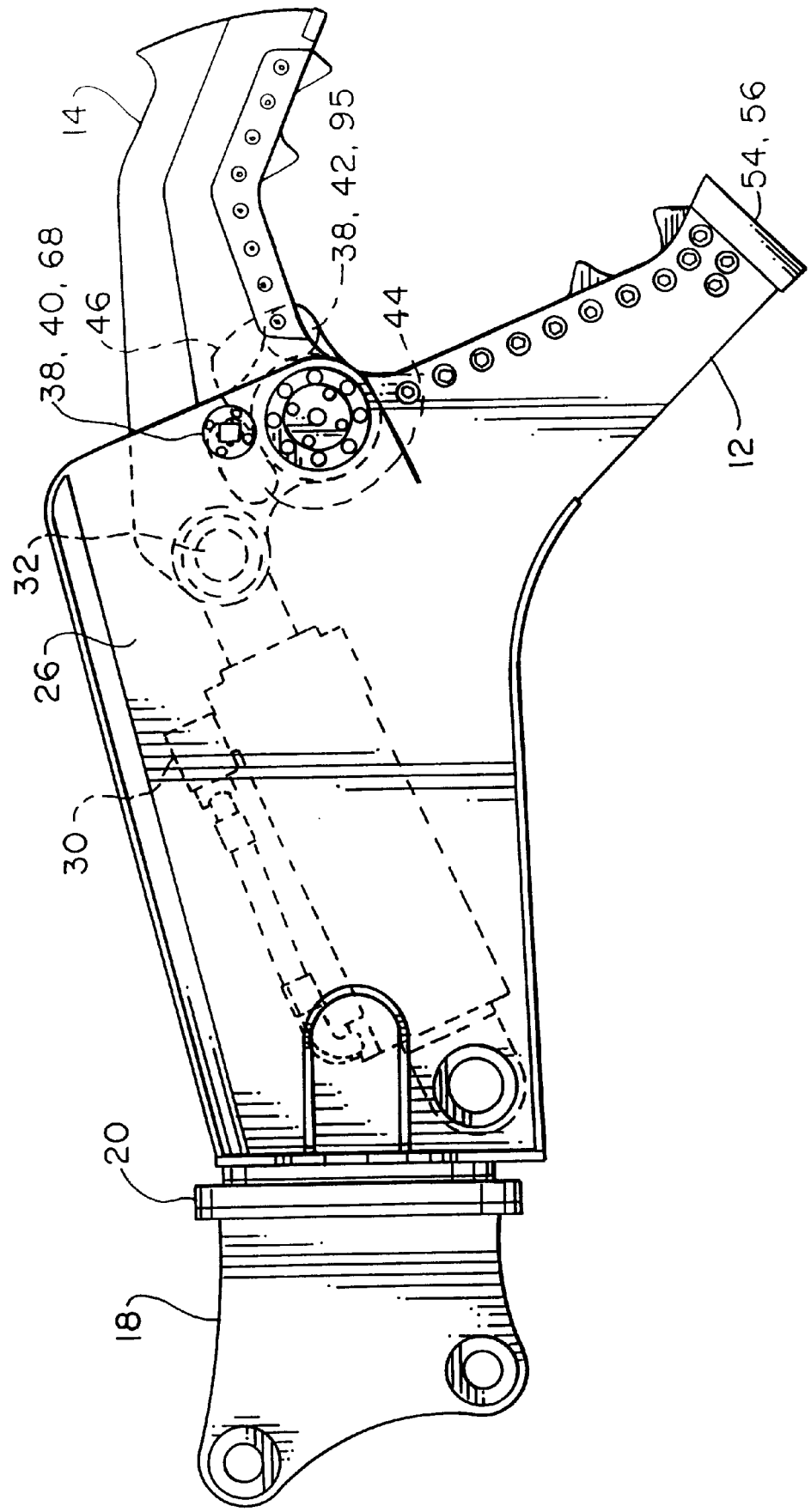
FIG. 8 is a right-side elevational view of the heavy-duty demolition apparatus of the present invention with some internal structure shown in phantom.
Figure 9:
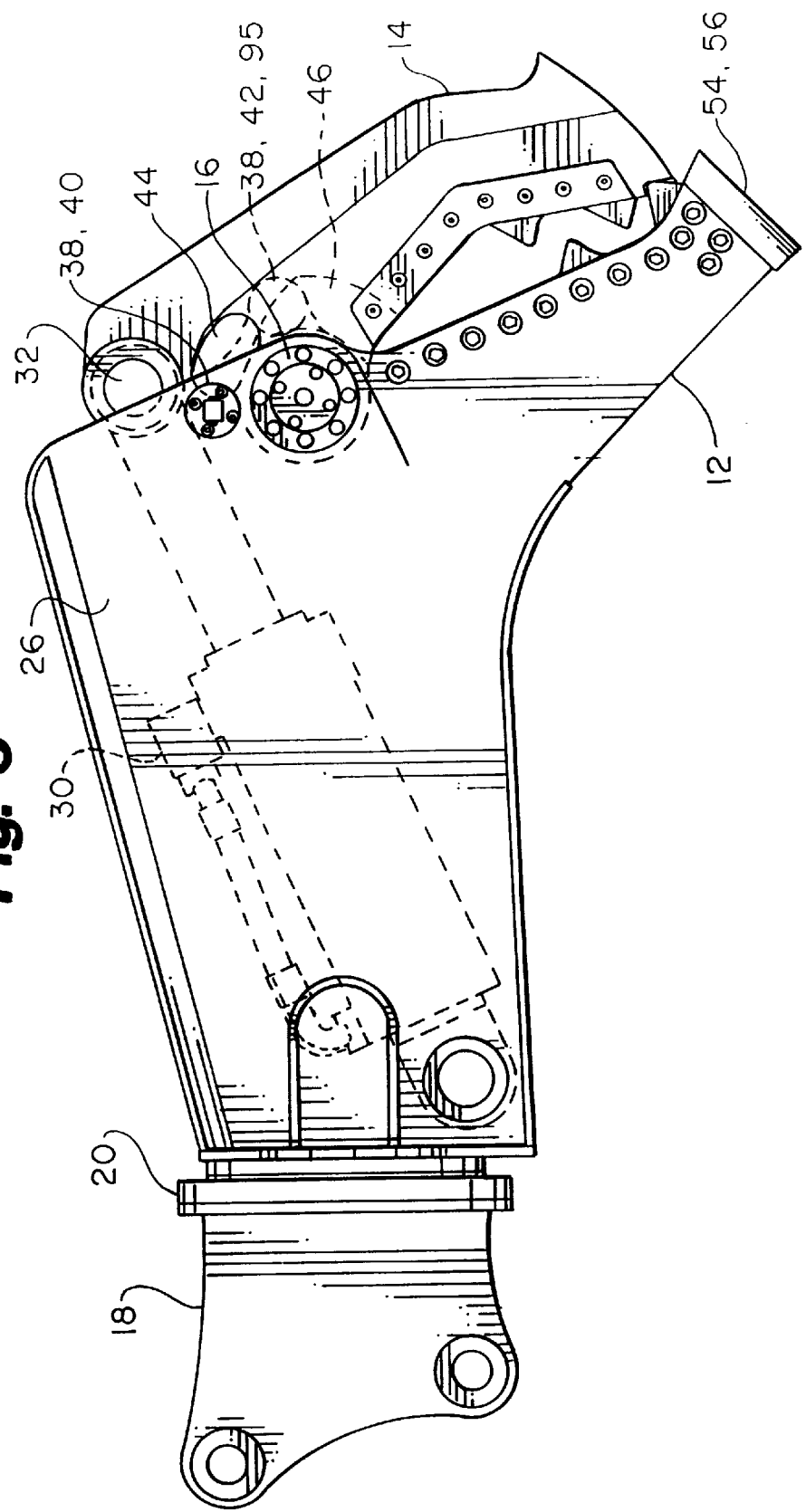
FIG. 9 is the same as FIG. 8, showing the upper jaw partially closed.

Operation of the present invention may best be seen by viewing FIGS. 8–10. In FIG. 8, the upper jaw 14 is in the open position, preparatory to shearing the workpiece. It will be seen that the guide or pad or guide pad 68 rests at one end of the first arcuate wear surface 44 and the guide or pad or guide pad 95 rests at one end of the second arcuate wear surface 46. In FIG. 9, the upper jaw has partially closed on the workpiece (not shown) and has begun to shear the workpiece. The guides 68, 95 are still supported by the wear surfaces 44, 46 respectively. In FIG. 10, the upper shear blade has been entirely received in the slot 58 and is supported by the guide plates 60 (not visible in FIG. 10). Consequently, the support of the guide pads 68, 95 is no longer required and the guide pad 68 has moved off the first arcuate wear surface 44. Although not shown in the Figure, the second arcuate wear surface could also be dimensioned so that the guide pad 95 has moved off it at this point.

Before beginning operation, the guides 68, 95 may initially be set at a clearance of about 0.01 to 0.02 inches from the upper jaw by means of a feeler gauge. This clearance may be adjustable as the guide becomes worn by turning the bolt ends 78, 102 with a wrench. This clearance also allows the guides 68, 95 to clear the wear surfaces 44, 46 when the upper jaw 14 is opened.

Referring to FIGS. 11 through 18, the heavy duty demolition shear 10 with the replaceable crushing and shearing tip 150 may be seen and appreciated.

Again, shear 10 has a lower jaw 12, upper jaw 14 and pivot means 16 to permit the upper jaw 14 to open and close.

Shear 10 has connecting or attaching means 18 which may include a rotator unit 20. The shear 10 has a first shearing side of the upper jaw 22 and a second guide side of the upper jaw 24.

FIG. 11 shows the shear 10 with the blades and wear plates exploded away for ease of understanding of assembly and fitting of the blades and wear plates with bolts 174 and hardened bushings 172.

On the first shearing side 22, the upper jaw will receive the upper primary shear blade 31 and the upper secondary shear blade 33. The shear blades 31 and 33 meet at the upper shear blade apex 35 which is the last point wherein the upper jaw 14 shears a workpiece against lower elongate shear blade 36. On the lower jaw 12, the lower primary shear blade 36 and lower secondary shear blade 37 are received.

Along the guide blade 48 is guide blade wear plate pocket 49 at the outer end 50 of the guide blade which receives guide blade wear plate 51 for guiding the upper jaw 14 into the lower jaw 12 and to further assist in resisting lateral forces upon the upper jaw 14, together with the blade stabilizing device 38 and puck assembly 66 previously disclosed. The guide blade wear plate 51 is opposite the outer end 52 of the lower jaw 12.

Connecting the guide blade 48 and outer end of the shear blade 52 is the tie or nose plate 56 which suitably has a nose or tie wear plate pocket 57. Within the pocket 57 is situated the nose or tie longitudinal insert wear plate 59 which further protects the nose plate 56.

Referring to the exploded and assembled FIGS. of 11 through 14, the upper secondary shear blade 33 has integral therewith the upper secondary blade shearing and crushing tip 150. Tip 150 comprises a crushing point 152 and a shearing point 154 with a recessed support and shearing tip blade support portion 156 therebetween. FIG. 17 shows the angular relationship between the blade support and shearing portion 156 and that of the lower secondary blade 37 illustrated by angle A. This angular relationship may be approximately 15° but may be in a range of 3° to 45° to assist in the shearing action from shearing point 154 and along support and shearing tip blade portion 156 against lower secondary shear blade 37. Thereafter, shearing is upon the elongate lower shear blade 36 as the scrap or workpiece is sheared by upper primary and secondary shear blades 31 and 33. This shearing action creates a flat reduced piece of scrap.

The recessed center tip blade 160 is located and secured between the upper shearing blade tip 150 and guide blade side shearing and crushing blade tip 162. The center tip blade 160 is slightly recessed as further illustrated in FIG. 18 to begin shearing after shear points 154 and 166 have pierced the workpiece. The center tip blade 160 is also recessed to remain out of the way of the two crushing points 152 and 164 which will initiate crushing of concrete 180 and 182.

Figure 5:
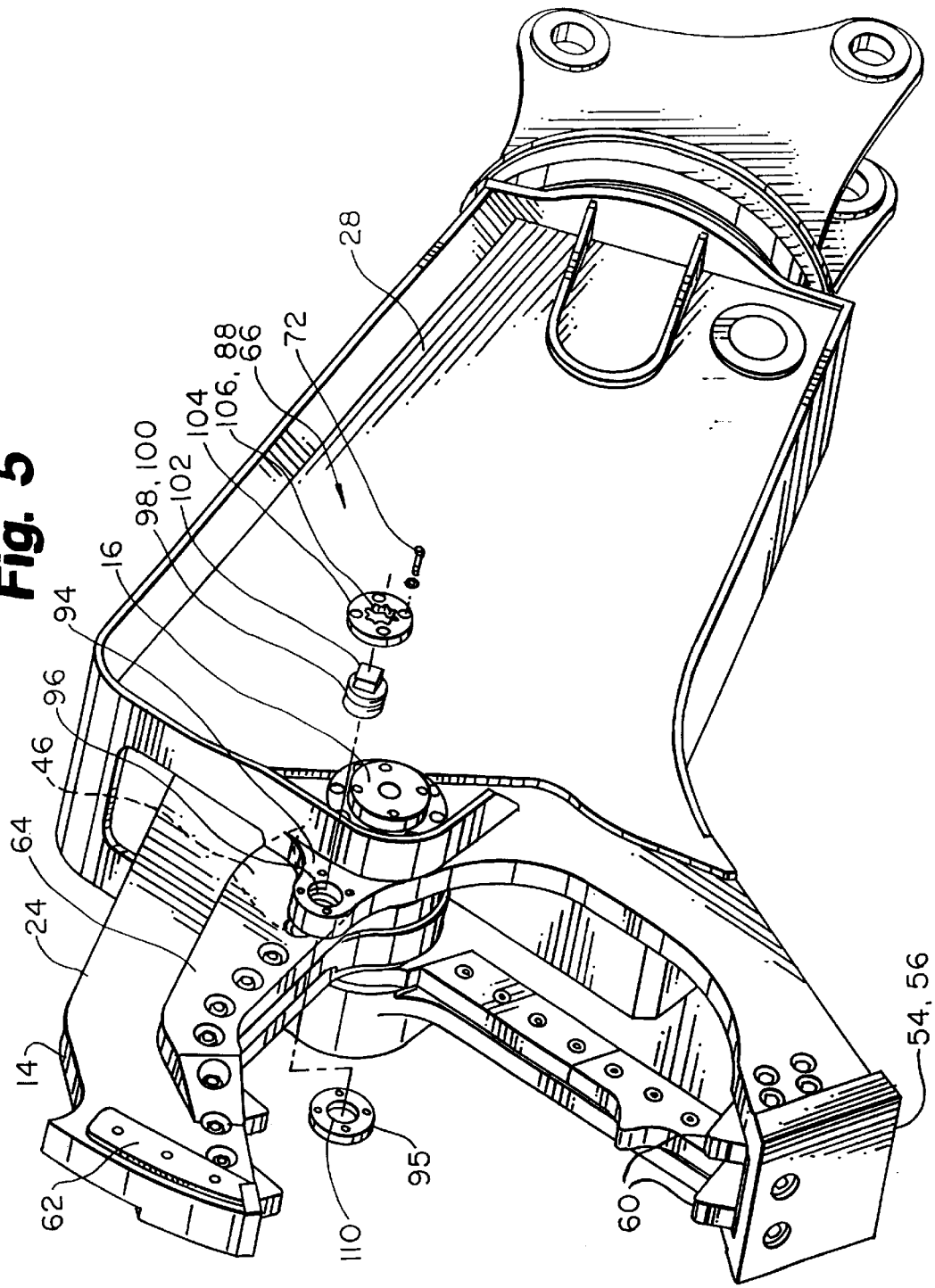
FIG. 5 is a left-side perspective view of the heavy-duty demolition apparatus of the present invention, with the parts of the second or front blade stabilizer being shown in exploded view.
Figure 6:
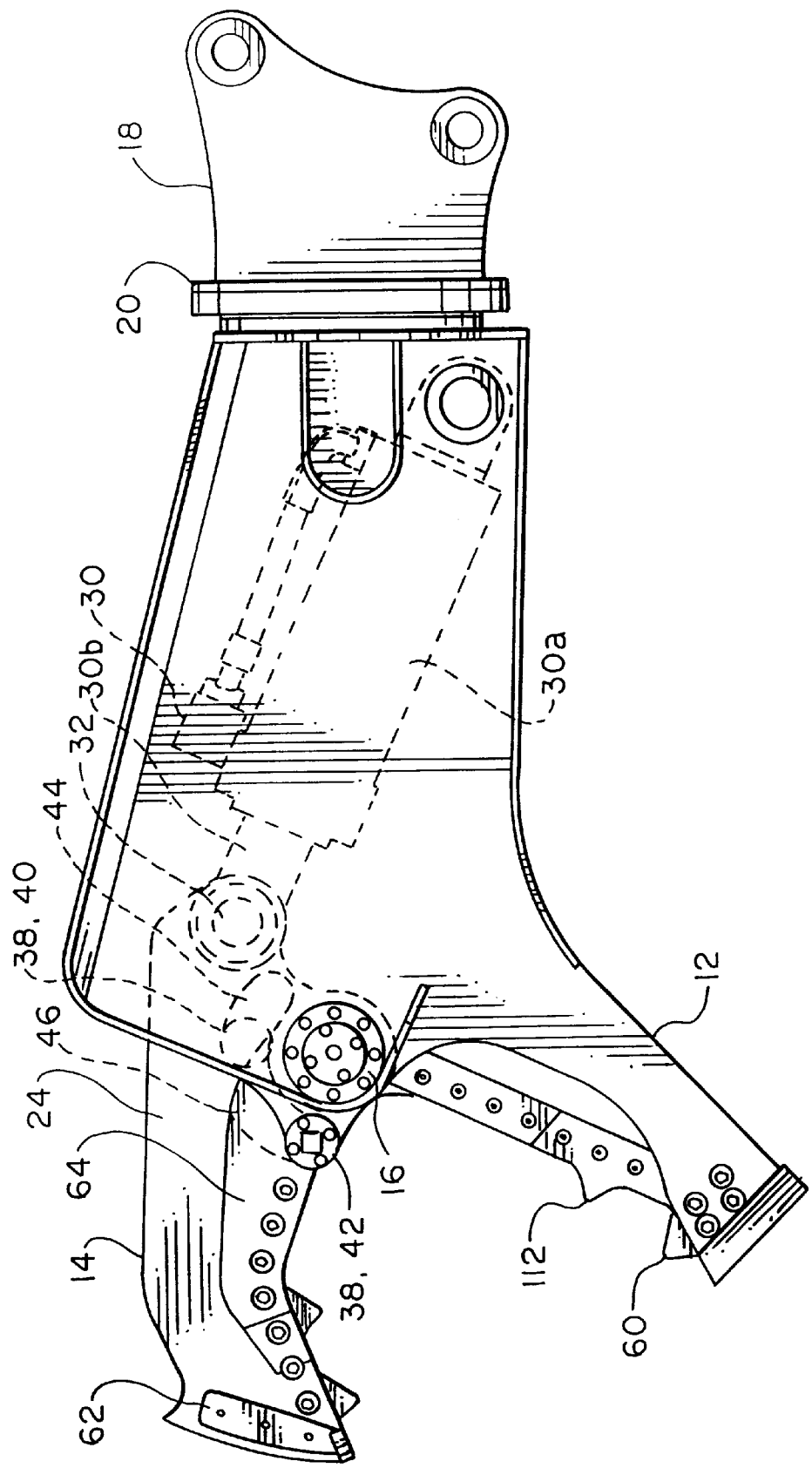
FIG. 6 is a left-side elevational view of the heavy-duty demolition apparatus of the present invention with some internal structure shown in phantom.

With reference to the guide side 24, the guide blade side shearing and crushing blade tip 162 takes the place of wear plate 62 in the first embodiment illustrated in FIG. 5. The blade tip 162 has crushing point 164, shearing point 166 and support a nd shearing tip blade portion 169. Apertures 170 pass through the respective blades and wear plates, as well as the jaw structures through which pass and are secured bolts and nuts 174. With respect to the upper blade tips 150, 160 and 162, guide blade wear plate 51 and lower secondary blade 37, retaining bushings 172 suitably may be utilized. The retaining bushings 172 are hardened suitably by heat treatment while the blades and wear plates are similarly hardened on a Rockwell c scale of 50 to 55 Rc.

Referring to FIGS. 15 and 16, it can be readily appreciated that the crushing points 152 and 164 provide two points of direct pressure upon a concrete column 180 or a concrete slab 182 for crushing of the concrete work piece 180 or 182 without any contact of the shearing point 154 and the tip blade portion 156.

With respect to metal scrap 184 which must be reduced to salvageably small stackable pieces, refer to FIGS. 17 through 20. The metal workpiece or scrap 184 is initially grabbed by the upper 14 and lower jaws 12 as they close down upon the workpiece. The shearing points 154 and 166 begin to pierce and shear the workpiece 184 as it is held by the support and shearing tip blade portion 156. The recessed center tip blade next pierces the scrap 184. The tip blade portion 156 next begins to shear. Then shearing continues rearwardly within the jaws with some shearing beginning at the upper primary shear blade 31. On the lower jaw, shearing is now along the primary blade 36. Shearing then is complete as the upper shear blade apex 35 passes below the lower elongate blade 36. The result of this shearing action is a substantially flat non-contorted or twisted workpiece.

The present invention may be embodied in other specific forms without departing from the spirit or essential attributes thereof, and it is therefore desired that the present embodiment be considered in all respects as illustrative and not restrictive reference being made to the appended claims rather than to the foregoing description to indicate the scope of the invention.

What is claimed:

1. A heavy-duty shearing and crushing demolition apparatus for attachment to a boom structure and hydraulic system of an excavator, the apparatus having a lower jaw, an upper jaw pivotally connected to the lower jaw, comprising:
   (a) a primary blade on the lower jaw;
   (b) primary and secondary blades on the upper jaw oblique with respect to each other;
   (c) a shearing and crushing tip on the upper jaw secondary blade having a distal shearing point and a crushing point therebehind as to expose the crushing point for crushing when the upper jaw is open from the lower jaw with the shearing tip out of the way and to expose the shearing tip for shearing when the upper jaw is closing into the lower jaw with the crushing tip out of the way to permit shearing beginning at the shearing tip and shearing rearwardly; and
   (d) the shearing and crushing tip further comprising a support and shearing tip blade portion between the shearing and crushing points for supporting and shearing the workpiece to produce a substantially flat non-contoured or twisted workpiece.

2. The heavy-duty shearing and crushing demolition apparatus of claim 1, wherein the support and shearing tip blade portion and the second blade of the lower jaw are between 3° and 45° with respect to each other as the upper jaw meets the lower jaw.

3. The heavy-duty shearing and crushing demolition apparatus of claim 2, wherein the support and shearing tip blade portion and the secondary blade of the lower jaw are approximately 15° with respect to each other.

4. The heavy-duty shearing and crushing demolition apparatus of claim 1, wherein the shearing and crushing tip are removably held in place on the upper jaw by bolts and hardened retaining bushings passing through the upper jaw and the shearing and crushing tip.

5. The heavy-duty shearing and crushing demolition apparatus of claim 1, wherein the shearing and crushing tip and the upper jaw secondary blade are one piece.

6. The heavy-duty shearing and crushing demolition apparatus of claim 1, further comprising a secondary blade on the lower jaw oblique with respect to the lower primary blade.

7. The heavy-duty shearing and crushing demolition apparatus of claim 6, wherein the primary blade on the lower jaw is elongate and at least twice as long as the lower secondary blade.

8. The heavy-duty shearing and crushing demolition apparatus of claim 6, wherein the primary blade is elongate and between two and four times the length of the lower secondary blade.

9. A heavy-duty shearing and crushing demolition apparatus for attachment to a boom structure and hydraulic system of an excavator, the apparatus having a lower jaw, an upper jaw pivotally connected to the lower jaw, comprising:

(a) primary and secondary blades on the lower jaw oblique with respect to each other;

(b) primary and secondary blades on the upper jaw oblique with respect to each other;

(c) a shearing and crushing tip on the upper jaw secondary blade are removably held in place on the upper jaw by bolts and hardened retaining bushings passing the upper jaw and the shearing and crushing tip, the shearing and crushing tip having a distal shearing point and a crushing point therebehind as to expose the crushing point for crushing when the upper jaw is open from the lower jaw with the shearing tip out of the way and to expose the shearing tip for shearing when the upper jaw is closing into the lower jaw with the crushing tip out of the way to permit shearing beginning at the shearing tip and shearing rearwardly; and (d) the shearing and crushing tip further comprising a support and shearing tip blade portion between the shearing and crushing points the support and shearing tip blade portion lying at an acute angle relative to the lower jaw secondary blade as the upper jaw meets the lower jaw.

10. The heavy-duty shearing and crushing demolition apparatus of claim 9, wherein the support and shearing tip blade portion and the second blade of the lower jaw are between 3° and 45° with respect to each other as the upper jaw meets the lower jaw.

11. The heavy-duty shearing and crushing demolition apparatus of claim 9, wherein the support and shearing top blade portion and the secondary blade of the lower jaw are approximately 15° with respect to each other.

12. The heavy-duty shearing and crushing demolition apparatus of claim 9, wherein the shearing and crushing tip are removably held in place on the upper jaw by nuts and bolts and hardened retaining bushings passing through the upper jaw and the shearing and crushing tip.

13. The heavy-duty shearing and crushing demolition apparatus of claim 9, wherein the primary blade on the lower jaw is elongate and at least twice as long as the lower secondary blade.

14. The heavy-duty shearing and crushing demolition apparatus of claim 9, wherein the primary blade on the lower jaw is elongate and between two and four times the length of the lower secondary blade.

15. A heavy-duty shearing and crushing demolition apparatus for attachment to a boom structure and hydraulic system of an excavator, the apparatus having a lower jaw, an upper jaw pivotally connected to the lower jaw, comprising:

(a) an elongate primary blade and a secondary blade on the lower jaw oblique with respect to each other;

(b) primary and secondary blades on the upper jaw oblique with respect to each other;

(c) a shearing and crushing tip on the upper jaw secondary blade having a distal shearing point and a crushing point therebehind as to expose the crushing point for crushing when the upper jaw is open from the lower jaw with the shearing tip out of the way and to expose the shearing tip for shearing when the upper jaw is closing into the lower jaw with the crushing tip out of the way to permit shearing beginning at the shearing tip and shearing rearwardly; and (d) a support and shearing tip blade portion between the shearing and crushing tips wherein the support and shearing tip blade portion and the second blade of the lower jaw are between 3° and 45° with respect to each other as the upper jaw meets the lower jaw.

16. The heavy-duty shearing and crushing demolition apparatus of claim 15, wherein the support and shearing top blade portion and the secondary blade of the lower jaw are approximately 15° with respect to each other.

17. The heavy-duty shearing and crushing demolition apparatus of claim 15, wherein the shearing and crushing tip are removably held in place on the upper jaw by nuts and bolts and hardened retaining bushings passing through the upper jaw and crushing tip.

18. A heavy-duty shearing and crushing demolition apparatus for attachment to a boom structure and hydraulic system of an excavator for shearing or crushing a workpiece, the apparatus having a lower jaw and an upper jaw pivotally connected to the lower jaw, the apparatus comprising:

(a) a primary blade on the lower jaw;

(b) primary and secondary blades on the upper jaw oblique with respect to each other; and (c) a shearing and crushing tip on the upper jaw secondary blade having a distal shearing point and a crushing point therebehind as to expose the crushing point for crushing when the upper jaw is open from the lower jaw with the shearing tip out of the way and to expose the shearing tip for shearing when the upper jaw is closing into the lower jaw with the crushing tip out of the way to permit shearing beginning at the shearing tip and shearing rearwardly, the shearing and crushing tip further comprising a support and shearing tip blade portion between the shearing and crushing tips, a guide blade side shearing and crushing blade tip, and a center tip blade between the shearing tip and the guide blade side shearing and crushing blade tip, wherein the center tip blade begins shearing after the shearing tip has pierced the workpiece.

19. The heavy-duty shearing and crushing demolition apparatus of claim 18, wherein the center tip blade is slightly recessed between the shearing tip and the guide blade side shearing and crushing blade tip, whereby the center tip blade remains out of the way of the crushing point.

* * * * *